No. 626,040. Patented May 30, 1899.
J. R. ROWLANDS.
EXPANSION BOLT.
(Application filed Dec. 10, 1897. Renewed Apr. 14, 1899.)
(No Model.) 2 Sheets—Sheet 1.
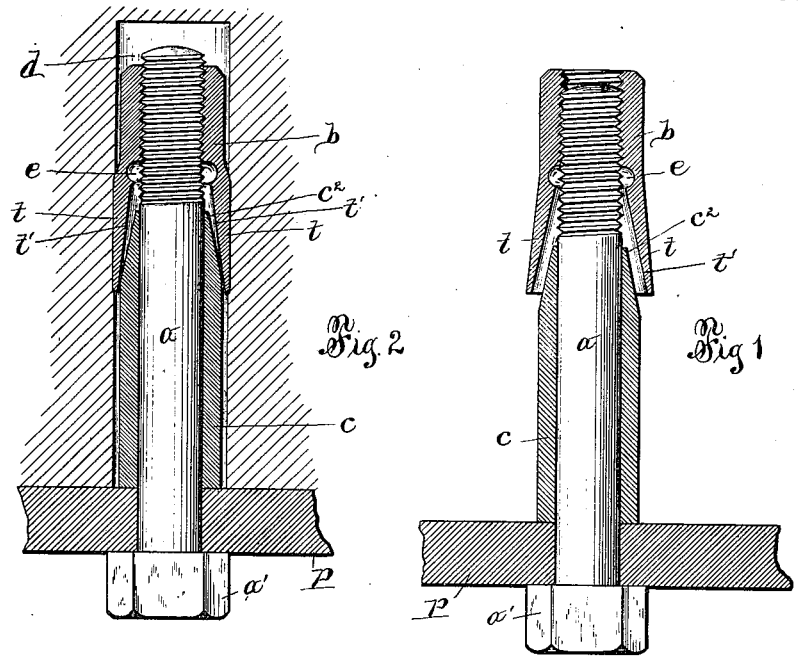
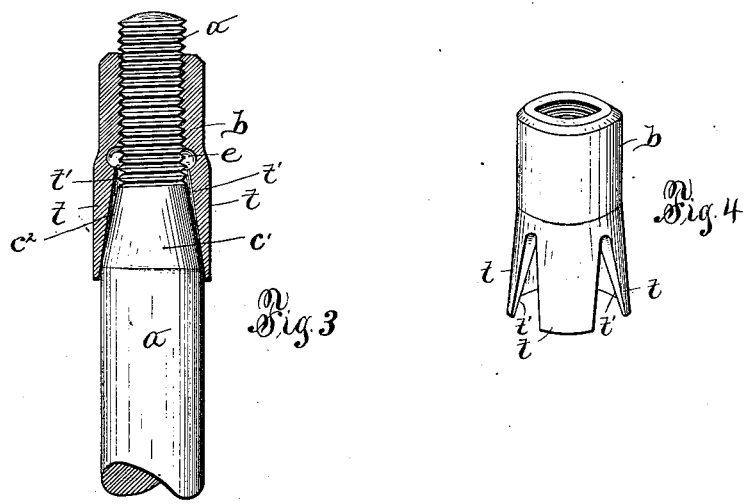
WITNESSES:
J. J. Laass
H. B. Smith
INVENTOR
John R. Rowlands
By E. Laass
ATTORNEY No. 626,040. Patented May 30, 1899.
J. R. ROWLANDS.
EXPANSION BOLT.
(Application filed Dec. 10, 1897. Renewed Apr. 14, 1899.)
(No Model.) 2 Sheets—Sheet 2.
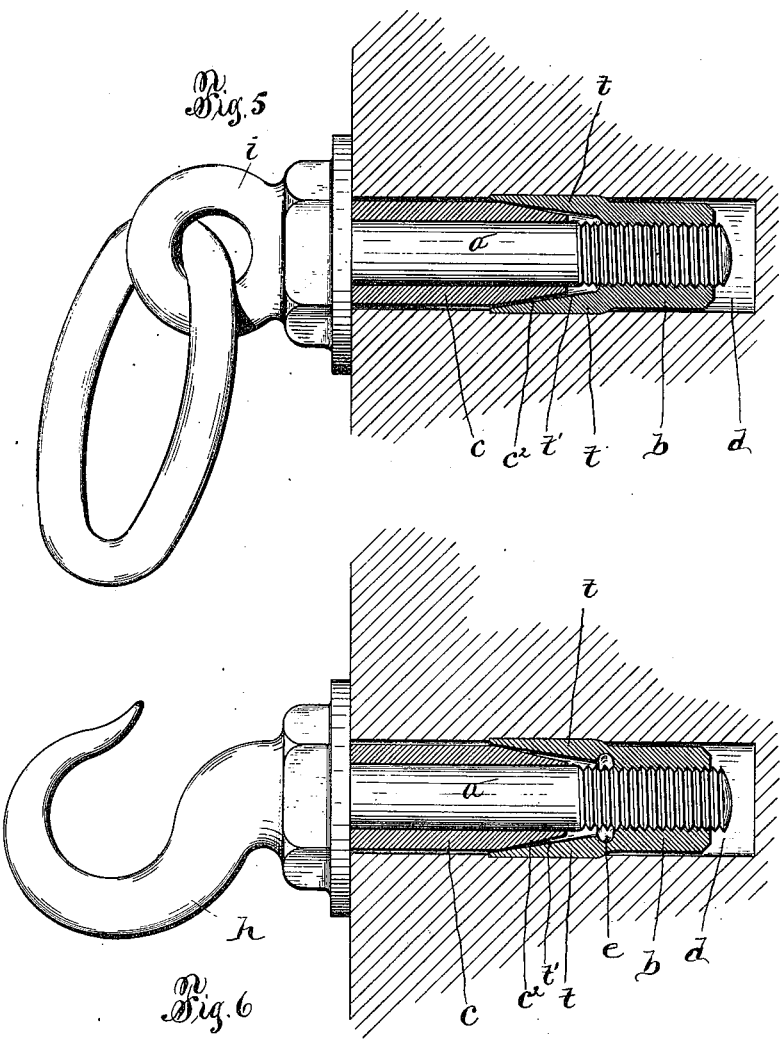
WITNESSES:
J. J. Laass.
H. B. Smith.
INVENTOR
John R. Rowlands
By E. Laass
ATTORNEY.

UNITED STATES PATENT OFFICE.

JOHN R. ROWLANDS, OF SYRACUSE, NEW YORK, ASSIGNOR TO WARREN H. BOLES, OF SAME PLACE.

EXPANSION-BOLT.

SPECIFICATION forming part of Letters Patent No. 626,040, dated May 30, 1899.

Application filed December 10, 1897. Renewed April 14, 1899. Serial No. 713,050. (No model.)

*To all whom it may concern:*

Be it known that I, JOHN R. ROWLANDS, of Syracuse, in the county of Onondaga, in the State of New York, have invented new and useful Improvements in Expansion-Bolts, of which the following, taken in connection with the accompanying drawings, is a full, clear, and exact description.

This invention relates to that class of bolt-fasteners which are usually termed "expansion-bolts" and are employed for securing a bolt in a socket formed in the wall or other object to which the bolt is to be attached, without passing completely through said object.

The invention consists in the combination of a tap-bolt formed with a cylindrical screw-threaded portion on the end inserted in the socket and with a head on its outer end to prevent longitudinal movement of the bolt, the nut formed with flexible stays extending toward the outer end of the bolt, and a smooth-faced wedge surrounding the shank of the bolt and forced between the aforesaid stays by the longitudinal travel imparted to the nut by the turning of the bolt, as hereinafter more fully described.

In the annexed drawings, Figures 1 and 2 are longitudinal sections of my invention shown in different stages of operation. Fig. 3 shows a preferred form of my invention. Fig. 4 is a detached perspective view of the nut, and Figs. 5 and 6 show the bolt shaped for different purposes.

Similar letters of reference indicate corresponding parts.

$a$ represents a tap-bolt which is formed with a cylindrical screw-threaded portion on the end entering the socket in the wall, to which the bolt is to be attached. The opposite or outer end of said bolt is provided with a head $a'$ to limit the longitudinal movement of the bolt in the aforesaid socket.

$b$ denotes the nut, which I provide with expansible tongues $t\ t$, extending from the nut toward the outer end of the bolt and formed, with the nut, in one piece of malleable iron or other suitable metal, affording flexibility to said tongues. These tongues constitute stays for locking the nut in the socket formed in the object to which the bolt is to be secured.

$c$ is a smooth-faced wedge or expander which may be formed of a tube or sleeve surrounding the shank of the bolt, but I may form the expander of an enlargement of the shank of the bolt, which enlargement is tapered to the screw-threaded portion of the bolt, as shown in Fig. 3 of the drawings. In either case, however, the end of the expander adjacent to the nut is to be beveled externally, as shown at $c^2$, sufficiently to allow it to enter under the free ends of the stays $t$, which are to be beveled or tapered internally to form wedging-surfaces, as shown at $t'$.

The described bolt, with its nut and expander, may be used for various purposes. Figs. 1 and 2 illustrate the use for attaching a plate P to the face of a wall. The operation of effecting said attachment is as follows, to wit: First, the requisite number of holes, each of nearly or quite the same diameter as the nut $b$ and the expander $t$, are to be drilled into the wall to form sockets $d$ for the reception of the required number of bolts with their nuts and expanders. Then a washer of the same thickness as the plate P is to be applied to one of the bolts, and the sleeve $c$ slipped over the shank of the bolt, and the nut $b$ applied to the screw-threaded end of the bolt. Then the bolt, with its said appurtenances, is forced into one of the sockets $d$, so as to cause the head of the bolt to push the washer onto the wall. The bolt is then prevented from moving farther longitudinally by the head thereof bearing on the washer.

In the operation of forcing the nut into the aforesaid socket the normally outward-deflected tongues $t\ t$ yield to lateral compression incident to their contact with the sides of the socket $d$, and by said contact the nut is prevented from turning. Then by turning the bolt so as to draw the nut toward the tapering end of the expander the latter enters under the tapering ends of the tongues $t\ t$ and pries the same outward until they become firmly wedged or set into the walls of the socket $d$, and thereby effectually lock the nut therein. Then the bolt is to be unscrewed, leaving the nut in the socket. This operation is carried on in each of the sockets required for fastening the plate P, which is provided with bolt-holes corresponding to the sockets. This plate is then placed in its requisite position over the sockets $d$, and the bolts $a$ to be passed through the holes of the plate and into the sockets $d$ and screwed into the nuts until the plate is firmly clamped onto the wall.

In order to allow the stays $t$ to expand more readily and conform to the interior of the socket $d$, so as to obtain a long frictional bearing therein, I form the said stays with transverse grooves $e$ adjacent to the nut proper.

The bolt $a$ may be provided with either a hook $h$ or an eye $i$ in lieu of the head $a'$, and thus used for different purposes. This latter form of the bolt is illustrated in Figs. 5 and 6 of the drawings.

It will be observed that by forming the expansible tongues integral with the nut I obtain a self-locking nut.

What I claim as my invention is—

1. The combination of a tap-bolt formed with a cylindrical screw-threaded portion on the end inserted in the socket and with a head on its outer end to prevent longitudinal movement of the bolt, the nut formed with flexible stays extending toward the outer end of the bolt and a smooth-faced wedge surrounding the shank of the bolt and forced between the stays by the longitudinal movement of the nut as set forth.

2. A self-locking nut consisting of the nut proper formed with flexible tongues extending vertically from one end of the nut in combination with a bolt working in said nut and formed with a tapering enlargement back of the screw-threaded portion by which enlargement the aforesaid tongues are expanded to lock the nut as set forth.

3. The combination with the bolt, of a nut formed with expansible rearwardly-extending stays and with transverse grooves in said stays adjacent to the nut, and an expander forced between the bolt and stays by the bolt working in the nut as set forth and shown.

In testimony whereof I have hereunto signed my name this 2d day of December, 1897.

JOHN R. ROWLANDS. [L. S.]

Witnesses:
  J. J. LAASS,
  H. B. SMITH.